US007264072B2

(12) United States Patent
Yoshikawa et al.

(10) Patent No.: US 7,264,072 B2
(45) Date of Patent: Sep. 4, 2007

(54) AIR INTAKE DEVICE FOR TWO-WHEELED MOTOR VEHICLE

(75) Inventors: Kiyohisa Yoshikawa, Akashi (JP); Atsushi Eto, Kakogawa (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 134 days.

(21) Appl. No.: 11/168,540

(22) Filed: Jun. 29, 2005

(65) Prior Publication Data

US 2006/0027202 A1 Feb. 9, 2006

(30) Foreign Application Priority Data

Aug. 9, 2004 (JP) ........................... P2004-232467

(51) Int. Cl.
*B62M 7/00* (2006.01)

(52) U.S. Cl. ................. 180/68.3; 180/219; 123/184.21

(58) Field of Classification Search ............... 180/68.3, 180/219; 123/41.58, 41.62, 184.21, 198 E
See application file for complete search history.

(56) References Cited

U.S. PATENT DOCUMENTS

| | | | | |
|---|---|---|---|---|
| 5,577,570 | A * | 11/1996 | Shiohara et al. | 180/219 |
| 6,409,783 | B1 * | 6/2002 | Miyajima et al. | 55/385.3 |
| 6,695,088 | B2 * | 2/2004 | Schroeder | 180/229 |
| 2005/0051375 | A1 * | 3/2005 | Momosaki | 180/219 |

FOREIGN PATENT DOCUMENTS

| | | |
|---|---|---|
| JP | 5-40092 | 5/1993 |

* cited by examiner

*Primary Examiner*—Tony Winner
(74) *Attorney, Agent, or Firm*—Wenderoth, Lind & Ponack, L.L.P.

(57) ABSTRACT

In an air intake apparatus for a two-wheeled motor vehicle, a body frame of the vehicle includes a hollow head box and a pair of right and left hollow main frames extending rearwards from the right and left sides of the head box. An air intake duct is positioned in front of the head box, a front inlet of an air cleaner positioned behind the head box is connected to a rear outlet of the head box, and an inside of the head box is connected to insides of the mainframes. Preferably, insides of rear edges of the main frames communicate with each other through a hollow cross pipe.

5 Claims, 8 Drawing Sheets

AIR INTAKE DEVICE FOR TWO-WHEELED MOTOR VEHICLE

BACKGROUND OF THE INVENTION

1. Field of the Invention

The present invention relates to a two-wheeled motor vehicle, and particularly relates to an air intake device for the two-wheeled motor vehicle, the air intake device being employed for leading air from an air intake part to an air cleaner.

2. Description of the Related Art

Conventionally, there has been provided an air intake device for a two-wheeled motor vehicle, in which an air intake part thereof is arranged on a front part of a vehicle body with the front of the air intake part being open so as to efficiently take in the open air from the front while the motor vehicle is moving forward, and in which the open air is led to an air cleaner through an air intake duct. Also, there has been provided the air intake device for the two-wheeled motor vehicle, in which part of a frame (hereinafter, referred to as a body frame) of the vehicle body is used as an air intake passage in order to save the pipe arrangement of the air intake duct and to save the space for the arrangement, as disclosed in Japanese Utility Model Registration No. 2558687 (which corresponds to Japanese Laid-Open Utility Model Publication No. 5-40092).

FIGS. 7 and 8 show one example of the conventional air intake device. As shown in FIG. 7 which is a horizontal cross sectional view thereof, the body frame 100 of the motor vehicle has a hollow head box 102 in which a head pipe 101 is provided, has a pair of main frames 105 extending in right and left directions from behind the head box 102, and has an air intake duct 106 connected to the front part of the head box 102 where the front part of the air intake duct 106 is open wider. In the head box 102, there is an intake passage 110 which extends backward and forward, generally linearly. The air intake passage 110 and an inside of each of the right and left main frames 105, are separated by a partition 111.

As shown in FIG. 8 which is a sectional view taken on a line corresponding with VIII-VIII in FIG. 7, an inlet duct 115 of an air cleaner 112 located rearward of the head box 102, is connected to the rear part of the air intake passage 110 of the head box 102. In the arrangement, a resonator 116 extending downward, is attached to the lower part of the air intake duct 106, in order to reduce the suction noise.

In the air intake device as shown in FIGS. 7 and 8, the air A taken in the air intake passage 110 from the front opening of the air intake duct 106, firstly enters the air intake passage 110 in the head box 102, is diverged by the head pipe 101 in right and left directions, and then is supplied to the air cleaner 112 located rearward.

According to the conventional air intake device as shown in FIGS. 7 and 8, the air A taken from the air intake duct 106 is made to flow inside the air intake passage 110 formed substantially linearly until the air A reaches the inlet of the air cleaner 112, and in the arrangement, the resonator 116 is mounted on the body frame 100 of the vehicle, as an additional member which projects downward, in order to reduce the suction noise, as aforementioned. Therefore, with the conventional arrangement, it is necessary to provide a space for mounting the resonator 116, the volume of the resonator 116 is limited, and the number of parts for assembling the air intake device increases, inevitably.

SUMMARY OF THE INVENTION

In view of the foregoing, it is an object of the present invention to provide an air intake device with a resonator for a two-wheeled motor vehicle, in which the resonator has a sufficiently large volume and is composed of a reduced number of parts.

Also, it is another object of the present invention to provide the air intake device with the resonator, in such a manner that there is no need for a particular space for providing the resonator.

In accomplishing these objects of the present invention, there is provided an air intake device for a two-wheeled motor vehicle having a body frame including a hollow head box which is configured to support a steering handle and which is provided with a front opening, a side opening and a rear opening, each communicating fluidically with a hollow portion of the head box, the body frame further including a pair of right and left main frames each of which has a hollow portion, the right and left main frames being connected to right and left sides of the head box respectively so as to extend rearward, the air intake device comprising: an air cleaner having a front inlet which is connected to the rear opening of the head box, wherein the air cleaner is disposed behind the head box; and an air inlet duct having a front opening end which opens forward and having a rear opening end which is connected to the front opening of the head box, wherein the hollow portion of each of the right and left main frames is connected to the side opening of the head box so as to communicate fluidically with the hollow portion of the head box.

According to the mechanism, the air taken in from the air inlet duct while the vehicle is running, is passed inside the head box, and then flows in the air cleaner. In the arrangement, the inside (hollow portion) of the head box communicates fluidically with the insides (hollow portions) of the right and left main frames. With the mechanism, the main frame(s) function(s) as a resonator having a large volume, and therefore the air intake pulsation is diminished and the noise generated by the air intake is reduced. In other words, there is almost no need of providing particular parts for the resonator and a space for the resonator, in order to take a countermeasure against occurrence of the noise by the air intake. Furthermore, since the large volume of space inside the main frame(s) is employed, the noise due to the air intake is significantly reduced.

Also, according to the mechanism, the space inside the main frame (s), which have been employed conventionally, is used as the resonator. Therefore, with the mechanism, it is possible to downsize the piping for the air intake, to reduce the number of assembling components for the air intake device, and to reduce the cost for the same.

Preferably, the hollow portion of one of the right and left main frames can communicate fluidically with the hollow portion of the other of the right and left main frames through a hollow cross pipe of the body frame.

With the mechanism, it is possible to maximize the volume of space used for the resonator, thus facilitating the effect to reduce the noise due to the air intake.

In the mechanism, for example, the hollow portion of the head box and the hollow portion of each of the right and left main frames can be separated by a partition wall with a communication path which communicates fluidically between the hollow portion of the head box and the hollow portion of each of the right and left main frames.

In the above mechanism, preferably, the communication path can have a cross sectional area smaller than that of the partition wall.

With the mechanism, reduction of the noise of the air intake can be facilitated furthermore.

As one modification, for example, the hollow portion of a rear part of one of the right and left main frames and the hollow portion of a rear part of the other of the right and left main frames, can be blocked from each other by a blocking member.

With this mechanism, it becomes easy to adjust, or set up, the volume of space used for the resonator without changing a basic design of the air intake device, whenever such an adjustment or setup is necessary.

BRIEF DESCRIPTION OF THE DRAWINGS

These and other objects and features of the present invention will become clear from the following description taken in conjunction with preferred embodiments thereof with reference to the accompanying drawings.

DETAILED DESCRIPTION OF THE PREFERRED EMBODIMENTS

Figure 1:
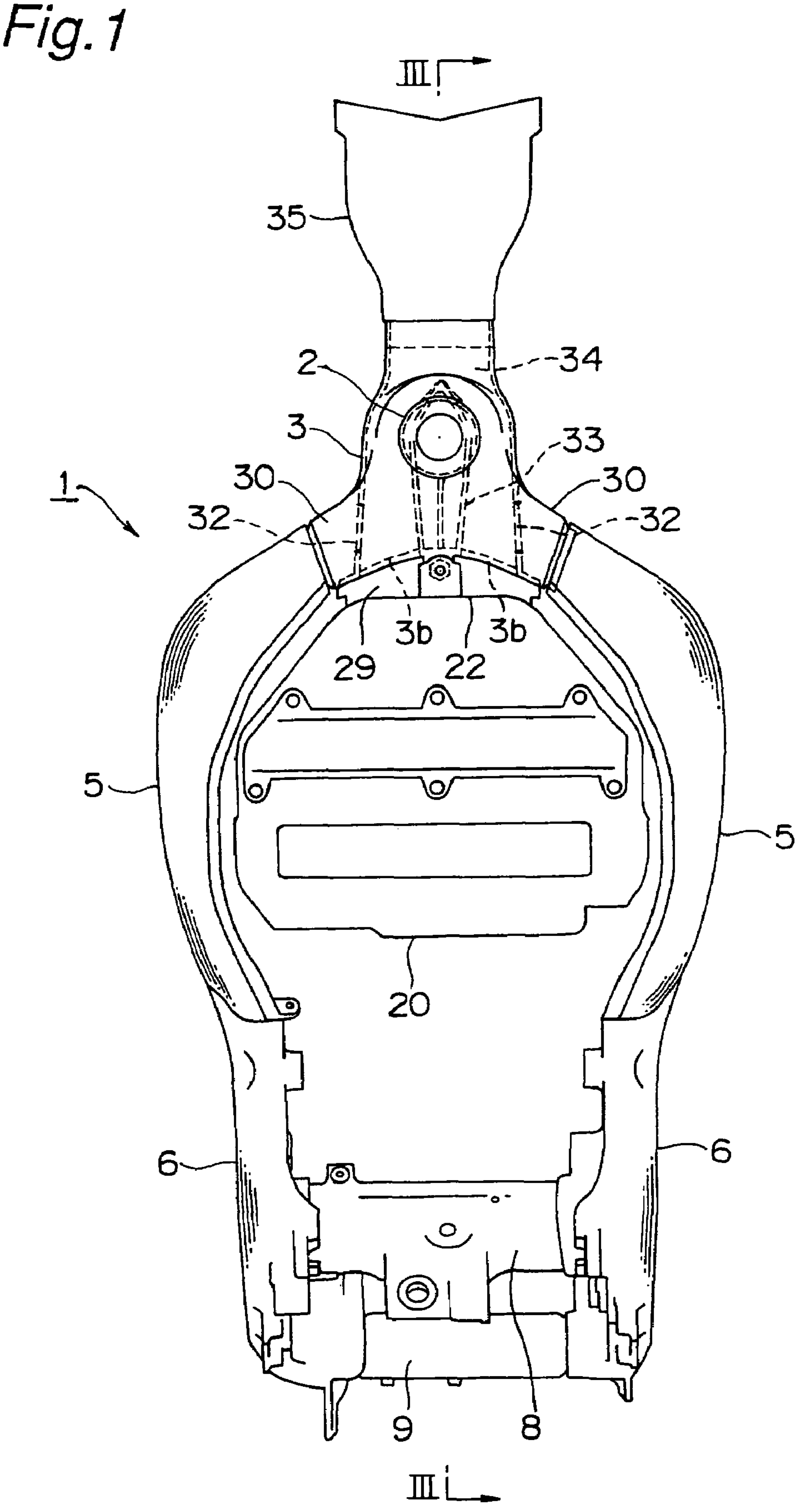
FIG. 1 is a plan view showing a body frame of a two-wheeled motor vehicle, and an air intake device for the two-wheeled motor vehicle, according to a first embodiment of the present invention.

Before a description of preferred embodiments of the present invention proceeds, it is to be noted that like or corresponding parts are designated by like reference numerals throughout the accompanying drawings.

Referring to FIGS. 1-6, the description is made below on an air intake device for a two-wheeled motor vehicle, according to each of a first embodiment and a second embodiment of the present invention.

First, with reference to FIGS. 1-5, it is explained about the air intake device according to the first embodiment of the present invention.

FIG. 1 is a plan view showing a body frame 1 of the two-wheeled motor vehicle and showing the air intake device for the two-wheeled motor vehicle. The body frame 1 has a Y-shaped head box 3 which has a head pipe 2 supporting a steering handle (not shown) of the vehicle and integrally formed with a pair of right and left hollow main frames 5 which are connected to right and left sides of forked rear parts of the head box 3, a pair of right and left hollow swing arm brackets 6 which are connected to rear parts of the main frames 5, and hollow cross pipes 8, 9 which connect the right and left swing arm brackets 6 to each other. An air cleaner 20 is mounted in a space surrounded by the head box 3 and the main frames 5. A front inlet 22 of the air cleaner 20 is connected to a rear opening 3*b* of the head box 3 through a rubber duct 29, such that air can flow from the head box 3 to the air cleaner 20.

Figure 2:
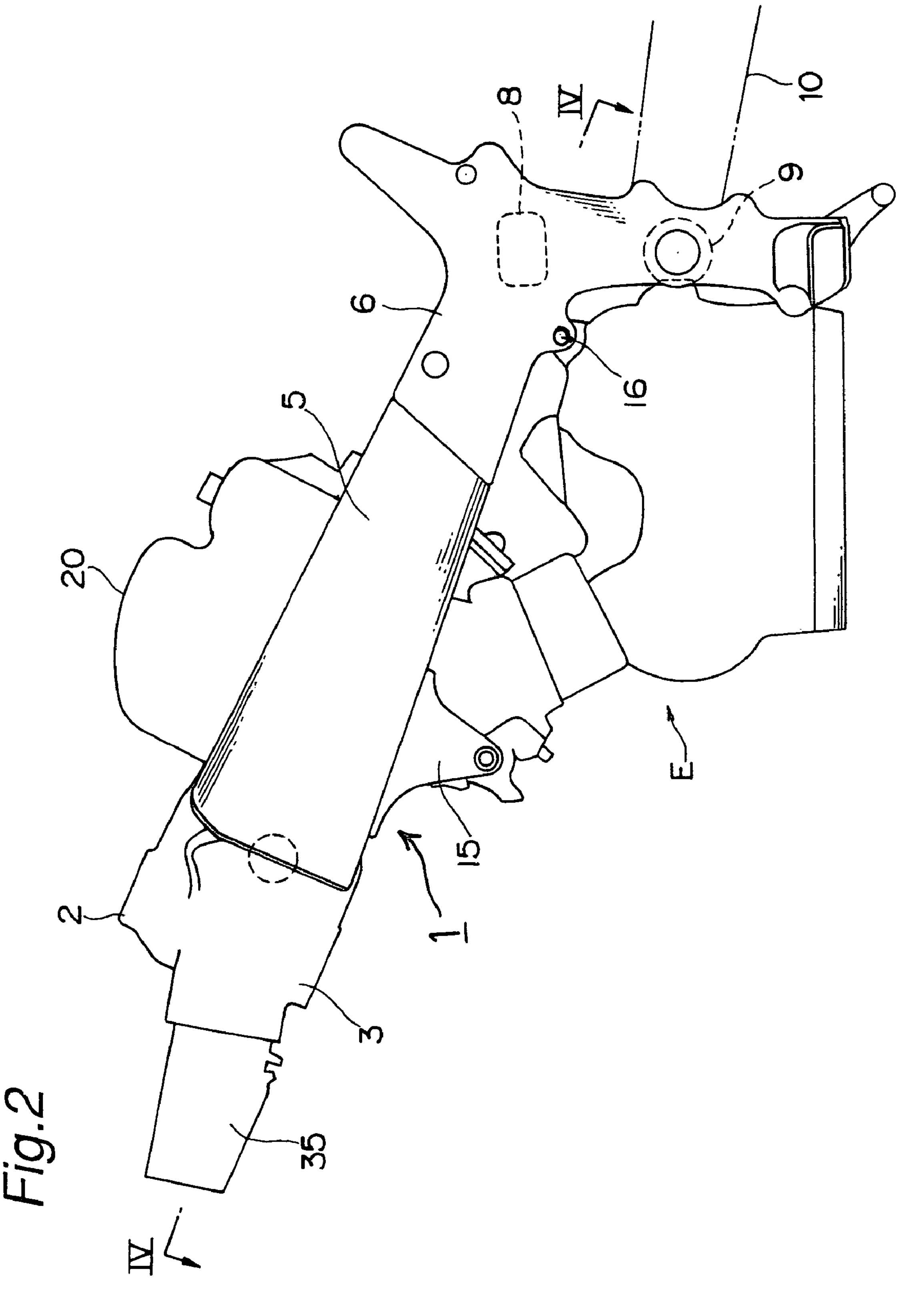
FIG. 2 is a left side view of FIG. 1.

FIG. 2 is a left side view of the body frame 1 shown in FIG. 1. As shown in the figure, the swing arm bracket 6 is bent downwards in an L-shaped form toward a rear of the motor vehicle. A front part of a swing arm 10 is pivoted on the swing arm bracket 6 such that the swing arm 10 can swing up and down relative to the swing arm bracket 6. An engine E is mounted under the main frame 5. The engine E is, for example, an inline four-cylinder engine, and the engine E is supported by engine attachment parts 15, 16 which are formed on the main frame 5 and the swing arm bracket 6, respectively.

Figure 3:
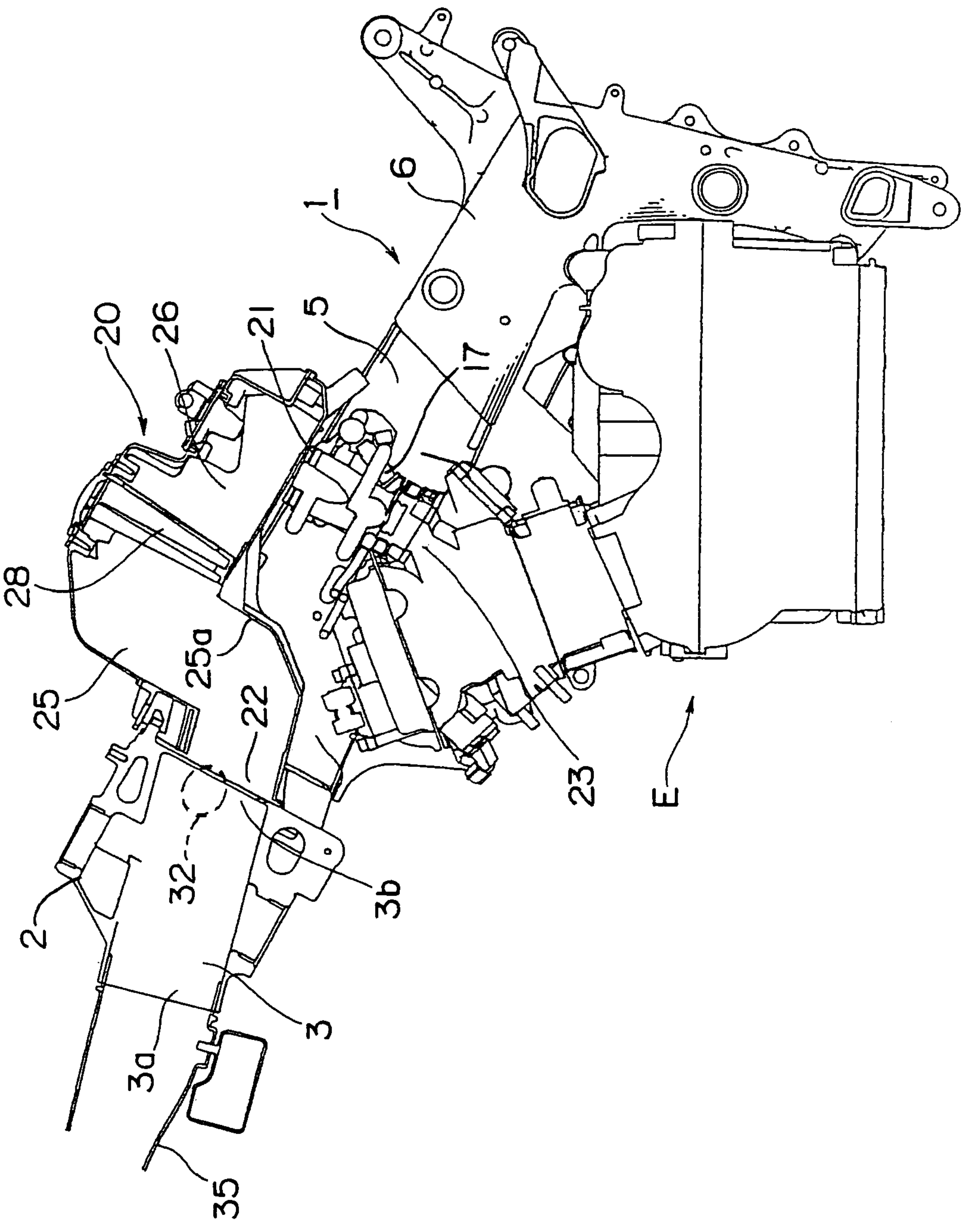
FIG. 3 is a sectional view taken on a line corresponding with III-III in FIG. 1.

FIG. 3 is a sectional view taken on a line corresponding with III-III in FIG. 1. There is arranged a throttle body (or carburetor) 17 between the engine E and the air cleaner 20 located above the engine E. An air outlet 21 formed on a rear lower surface of the air cleaner 20 is connected to an upper inlet of the throttle body 17. A lower outlet of the throttle body 17 is connected to an inlet port 23 of each cylinder of the engine E. An air passage 25 located at a front part of the air cleaner 20 is in an L-shaped form, where the rear half of the air passage 25 is above the front half of the air passage 25, and the air passage 25 communicates with a clean space 26 located at a rear part of the air cleaner 20 through a filter element 28.

Figure 4:
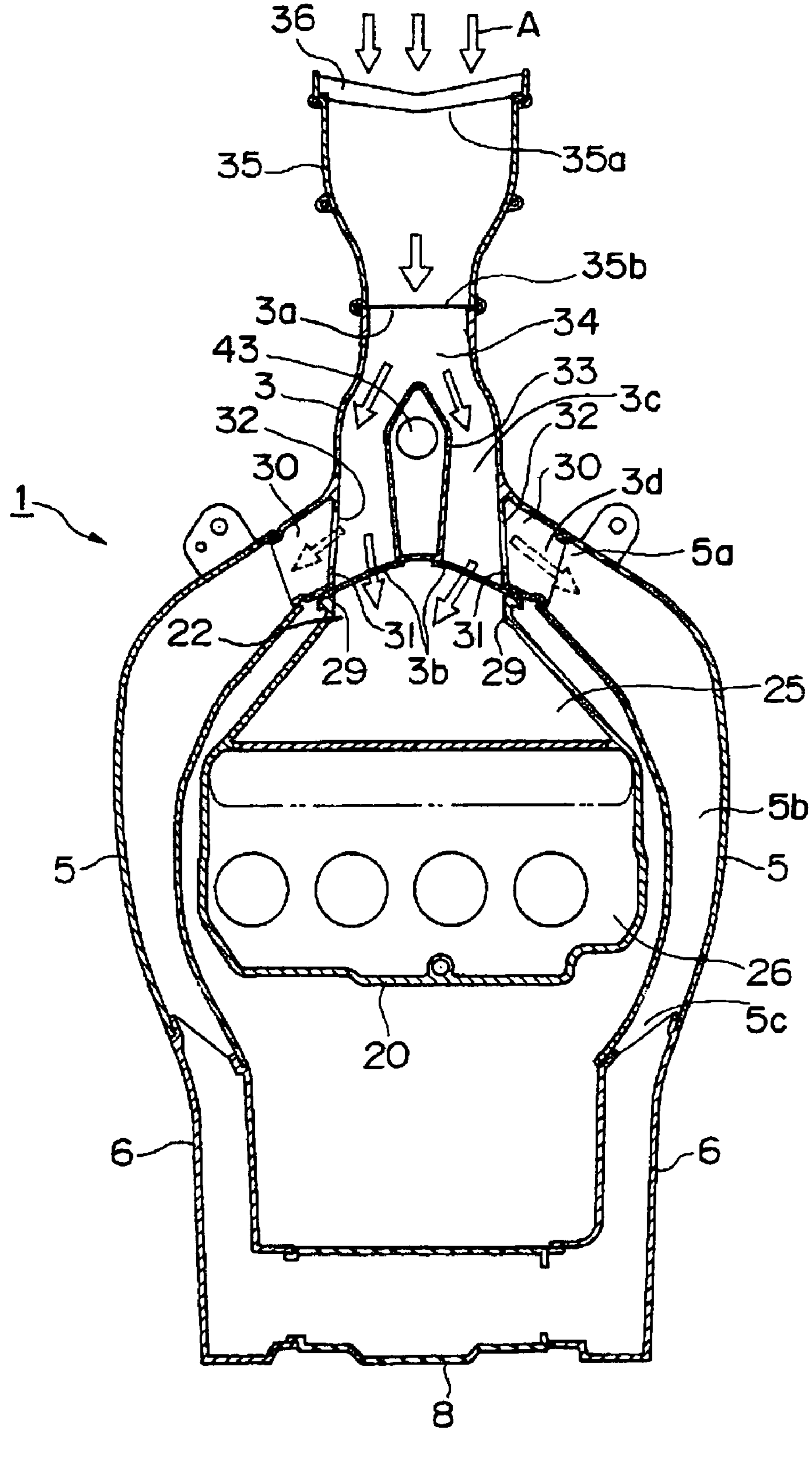
FIG. 4 is a sectional view taken on a line corresponding with IV-IV in FIG. 2.

FIG. 4 is a sectional view taken on a line corresponding with IV-IV in FIG. 2. As shown in the figure, the head box 3 is formed hollow and has an air intake passage 34 penetrating the head box 3 from a front opening 3*a* to a rear opening 3*b* through a hollow portion 3*c* of the head box 3 in a direction from the front to the rear of the body frame 1. A central partition wall 33, having a bullet-shaped (or wedge-shaped) cross section, is formed centrally with respect to a width direction to the right and left of the body frame 1. With this central partition wall 33, the air intake passage 34 is divided into two in the width direction to the right and left of the body frame 1. The central partition wall 33 is formed hollow and supports a steering shaft 43 extending inside the central partition wall 33.

An air intake duct 35 is connected to the front opening 3*a* of the head box 3, and the air intake duct 35 is formed so as to open wider towards the front. A dust-proof net 36 is attached to the front opening 35*a* of the air intake duct 35. Thereby, air A, generated while the two-wheeled motor vehicle is running, is taken in the air intake duct 35 from the front opening 35*a* through the dust-proof net 36.

A fork-shaped rear part of the head box 3, is composed of a pair of hollow branch parts 30 which extend in the width direction to the right and the left of the body frame 1, respectively. In the arrangement, each of front openings 5*a* of hollow portions 5*b* of the hollow main frames 5 is connected to each of side openings 3*d* of the hollow branch parts 30, such that the hollow of the hollow branch part 30 communicates fluidically with the hollow portion 5*b* of the main frame 5. Between each of the hollow branch parts 30 and the air intake passage 34 of the head box 3, a rib 31 as a partition wall is provided to separate the hollow of the hollow branch part 30 and the hollow portion 5*b* of the hollow main frame 5 from the air intake passage 34. Each of the ribs 31 has a penetration hole (communicating path) 32 which communicates fluidically with each of the hollows of the hollow branch parts 30 and the air intake passage 34. The penetration hole 32 has a cross sectional area smaller than that of the partition wall 31.

Further, each of the hollow portions 5*b* of the hollow main frames 5 has a rear opening 5*c*, and the rear opening 5*c* communicates fluidically with the inside (the hollow) of the hollow swing arm bracket 6. Further, the insides (the hollows) of the right and left swing arm brackets 6 communicate fluidically with each other through the hollow cross pipe 8.

Figure 5:
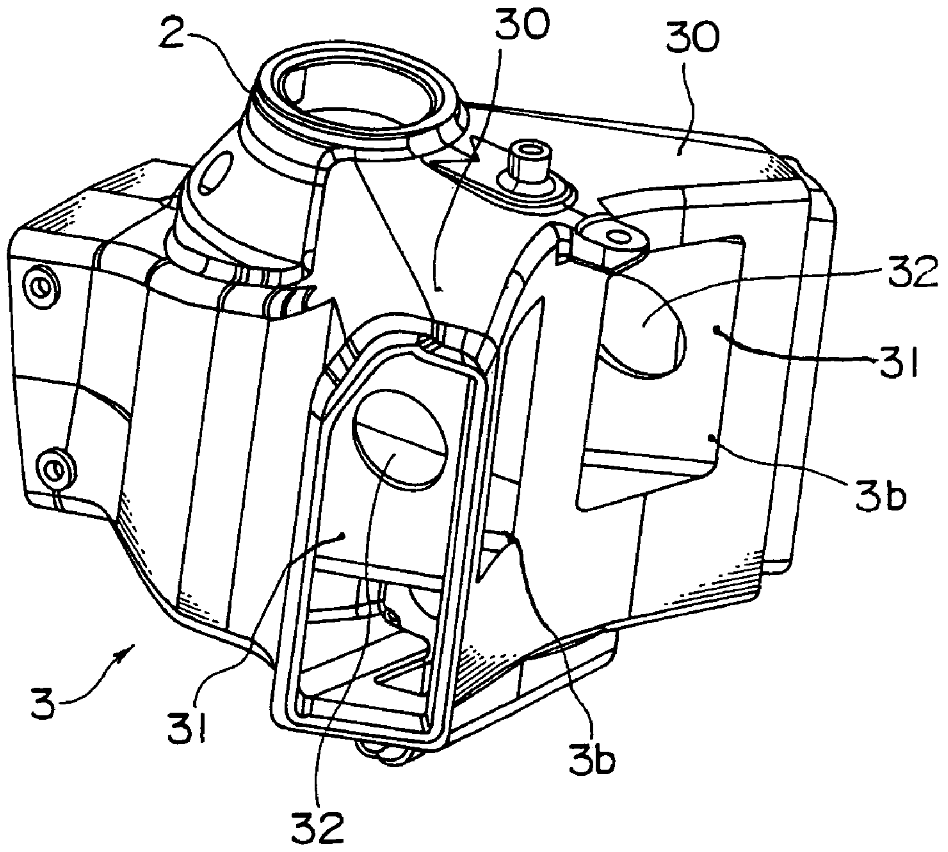
FIG. 5 is a perspective view of a head box shown in FIG. 1.

FIG. 5 is a perspective view of the head box 3. As shown in the figure, the height in a vertical direction of each of the right and left hollow branch parts 30 is greater than that of the front part of the head box 3, and the penetration hole 32 formed in each of the right and left ribs 31 is circular.

As shown in FIG. 4, the front inlet 22 of the air cleaner 20 is connected to the rear opening 3*b* of the head box 3, and the front opening 3*a* of the head box 3 is connected to a rear opening 35*b* of the air intake duct 35. With this mechanism, the air A from the front is taken in the air intake duct 35 from the front opening 35*a* through the dust-proof net 36, flows in the head box 3 with its ram pressure being exerted thereon, flows rearward through the air intake passage 34 inside the head box 3, is divided into the right and left streams of air by the central partition wall 33, and then flows in the air passage 25 of the air cleaner 20 from the rear opening 3*b* of the head box 3.

The air intake passage 34 inside the head box 3, communicates fluidically with the hollow portion 5*b*, with a large volume, of each of the right and left hollow main frames 5, through each of the penetration holes 32 formed in the right and left ribs 31 and through each of the hollows of the hollow branch parts 30. Thereby, the inside (the hollow portion 5*b*) of each of the hollow main frames 5 functions as a resonator (or resonant chamber), the pulsation based on the air intake is damped, and the noise (or sound) of the air intake is reduced effectively.

Also, according to the embodiment, the rear openings 5*c* of the hollow main frames 5 communicate fluidically with the insides (the hollows) of the hollow swing arm brackets 6. With the mechanism, the hollow inside the hollow swing arm bracket 6 is employed as the resonator together with the hollow portion 5*b* inside each of the hollow main frames 5. Thereby, the volume of the resonator increases, and the effect of reducing the noise of the air intake is enhanced.

Furthermore, according to the embodiment, the hollow inside the hollow cross pipe 8 communicates fluidically with each of the hollows inside the swing arm brackets 6. Therefore, with the mechanism, the hollow inside the hollow cross pipe 8 is also employed as the resonator, and the effect of reducing the noise of the air intake is even more enhanced.

By the way, as shown in FIG. 3, the air flowing in the air passage 25 located in the front part of the air cleaner 20, hits, or collides with, an uprising wall 25*a* of the L-shape. Thereby, water particles included in the air are cut effectively, the air being separated from the water particles passes through the filter element 28 so as to filtrate the air, and the air is supplied inside the clean space 26 of the air cleaner 20. And then the filtrated air is supplied to the throttle body 17 from the clean space 26 through each of the air outlets 21.

According to the aforementioned embodiment, the hollow main frame 5 having the empty space (hollow portion 5*b*) inside, as a conventional one, is employed as the resonator. Thereby, it is possible to realize the downsizing of the air intake piping, to reduce the number of assembly parts for the air intake device, and therefore to reduce the cost for the same.

Figure 6:
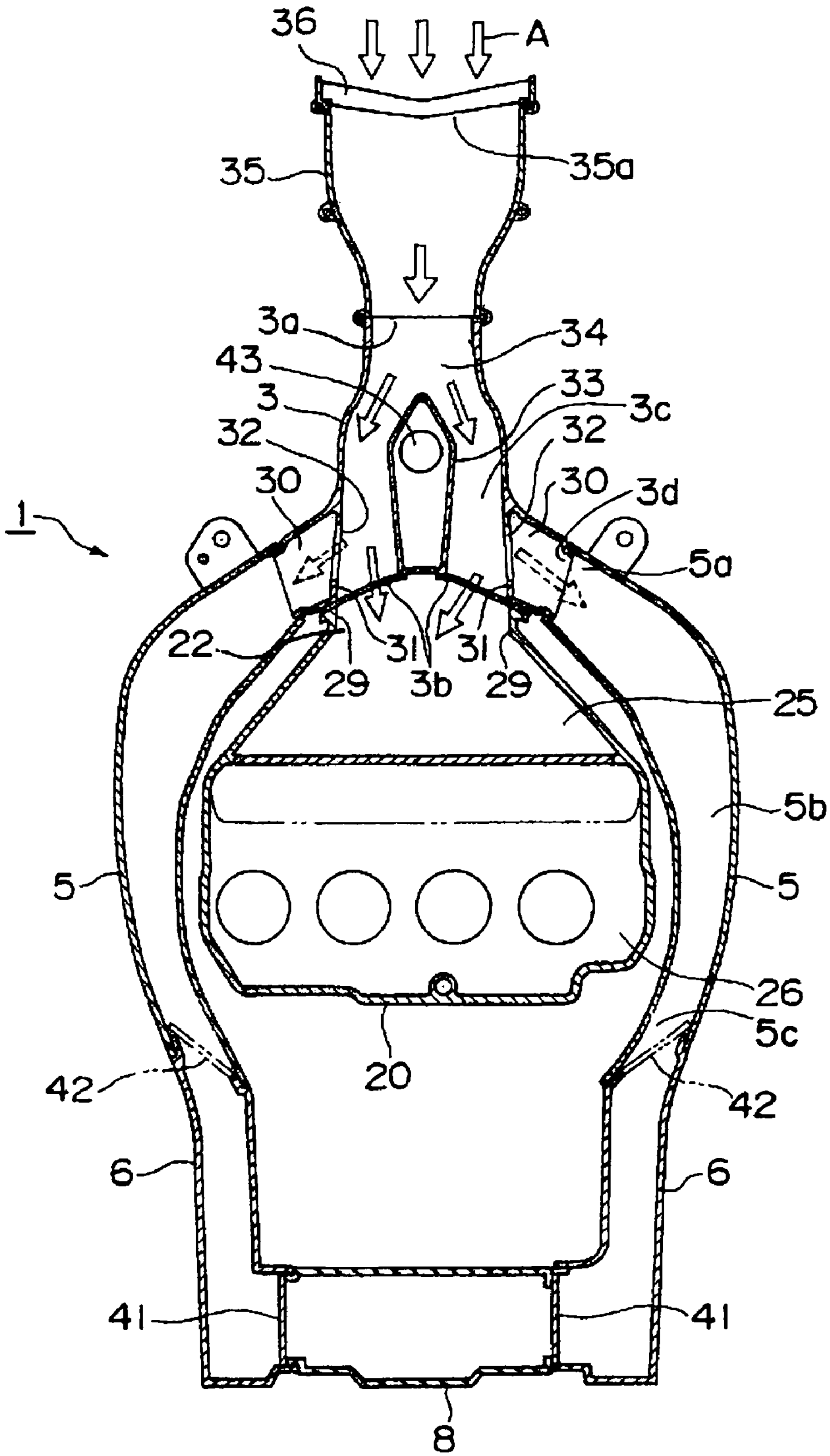
FIG. 6 is a sectional view, similar to FIG. 4, according to a second embodiment of the present invention.
Figure 7:
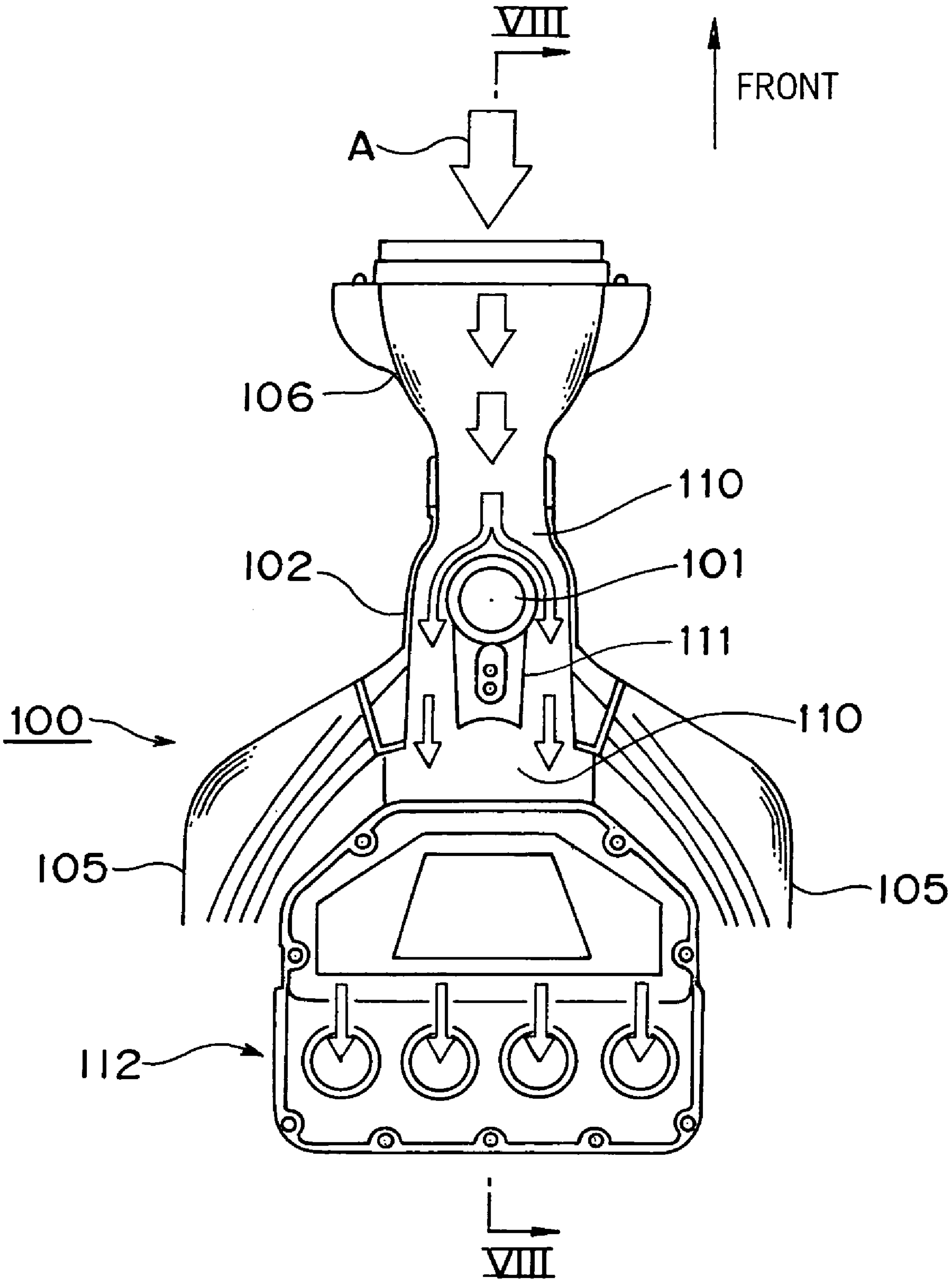
Fig.7 PRIOR ART
FIG. 7 is a horizontal cross sectional view of an air intake device according to prior art.
Figure 8:
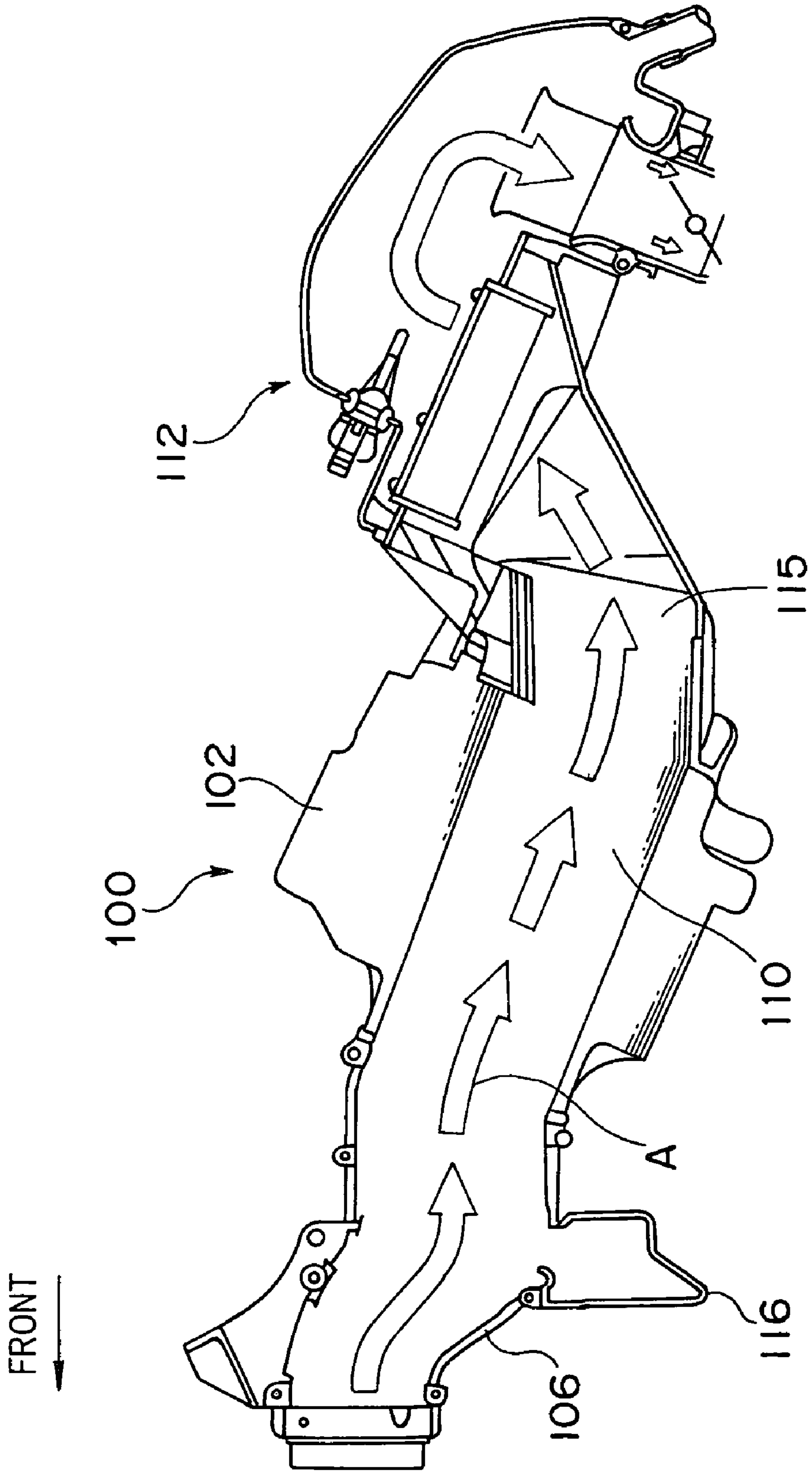
Fig.8 PRIOR ART
FIG. 8 is a sectional view taken on a line corresponding with VIII-VIII in FIG. 7.

Next, with reference to FIG. 6, it is explained about the air intake device according to the second embodiment of the present invention.

That is, according to the above first embodiment of the present invention, the hollow portions 5*b* of the hollow main frames 5 communicate fluidically with each other, through the insides of the right and left hollow swing arm brackets 6 and through the inside of the hollow cross pipe 8. Meanwhile, as the second embodiment, the air intake device has a construction in which each of the right and left ends of the hollow cross pipe 8 is blocked by a blocking member 41 as shown in FIG. 6, and in which only the space (hollow) inside each of the right and left main frames 5 and inside each of the right and left swing arm brackets 6 is employed as the resonator. Further, as a modification to the second embodiment, it is possible to construct the air intake device such that a blocking member 42, as shown by an imaginary line in FIG. 6, is mounted between the main frame 5 and the swing arm bracket 6, and such that only the space (hollow) inside the main frame 5 is employed as the resonator.

Although the present invention has been fully described in connection with the preferred embodiments thereof with reference to the accompanying drawings, it is to be noted that various other changes and modifications are also apparent to those skilled in the art. Such changes and modifications are to be understood as included within the scope of the present invention as defined by the appended claims unless they depart therefrom.

What is claimed is:

1. An air intake device of a two-wheeled motor vehicle having a body frame including a hollow head box configured to support a steering handle and which is provided with a front opening, a side opening and a rear opening, each communicating fluidically with a hollow portion of the head box, the body frame further including a pair of right and left main frames each of which has a hollow portion, the right and left main frames being connected to right and left sides of the head box respectively so as to extend rearward, the air intake device comprising:

an air cleaner having a front inlet which is connected to the rear opening of the head box, wherein the air cleaner is disposed behind the head box; and an air inlet duct having a front opening end which opens forward and having a rear opening end which is connected to the front opening of the head box, wherein the hollow portion of each of the right and left main frames is connected to the side opening of the head box so as to communicate fluidically with the hollow portion of the head box.

2. The air intake device as claimed in claim 1, wherein the hollow portion of one of the right and left main frames communicates fluidically with the hollow portion of the other of the right and left main frames through a hollow cross pipe of the body frame.

3. The air intake device as claimed in claim 1, wherein the hollow portion of the head box and the hollow portion of each of the right and left main frames are separated by a partition wall with a communication path which communicates fluidically between the hollow portion of the head box and the hollow portion of each of the right and left main frames.

4. The air intake device as claimed in claim 3, wherein the communication path has a cross sectional area smaller than that of the partition wall.

5. The air intake device as claimed in claim 2, wherein the hollow portion of a rear part of one of the right and left main frames and the hollow portion of a rear part of the other of the right and left main frames, are blocked from each other by a blocking member.

* * * * *